United States Patent
Chai et al.

(10) Patent No.: US 12,487,607 B2
(45) Date of Patent: Dec. 2, 2025

(54) NEAR REAL-TIME RECONSTRUCTION USING DRONES

(71) Applicant: NEC Laboratories America, Inc., Princeton, NJ (US)

(72) Inventors: Eugene Chai, Monmouth Junction, NJ (US); Karthikeyan Sundaresan, Manalapan, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 1281 days.

(21) Appl. No.: 17/220,046

(22) Filed: Apr. 1, 2021

(65) Prior Publication Data

US 2021/0311504 A1    Oct. 7, 2021

Related U.S. Application Data

(60) Provisional application No. 63/003,378, filed on Apr. 1, 2020.

(51) Int. Cl.
*G05D 1/00* (2006.01)
*B64U 10/14* (2023.01)
(Continued)

(52) U.S. Cl.
CPC ............ *G05D 1/106* (2019.05); *B64U 10/14* (2023.01); *G01S 17/89* (2013.01); *G05D 1/0094* (2013.01);
(Continued)

(58) Field of Classification Search
CPC ........ G01S 17/89; G01S 7/4817; G01S 7/003; G01S 7/481; G01S 17/894;
(Continued)

(56) References Cited

U.S. PATENT DOCUMENTS

2017/0227962 A1* 8/2017 Cesarano ................. G08G 5/80
2017/0337824 A1* 11/2017 Chen ..................... G05D 1/0202
(Continued)

FOREIGN PATENT DOCUMENTS

CN         109661349 A  *  4/2019  ........... B64C 39/024

OTHER PUBLICATIONS

Julius Kammerl et al., Real-time Compression of Point Cloud Streams, May 14-18, 2012, 2012 IEEE International Conference on Robotics and Automation, pp. 778-785 (Year: 2012).*

(Continued)

*Primary Examiner* — Hitesh Patel
*Assistant Examiner* — Elle Rose Knudson
(74) *Attorney, Agent, or Firm* — Vincent Duffy; Joseph Kolodka

(57) ABSTRACT

Systems and methods for automatically constructing a 3-dimensional (3D) model of a feature using a drone. The method includes generating a reconnaissance flight path that minimizes battery usage by the drone, and conducting a discovery flight that uses the reconnaissance flight path. The method further includes transmitting reconnaissance laser sensor data from the drone to a processing system for target identification, and selecting a target feature for 3D model construction based on the reconnaissance laser sensor data. The method further includes scanning the target feature using a laser sensor, transmitting laser sensor data for the target feature having a minimum point density from the drone to the processing system for 3D model construction, and constructing the 3D model from the minimum point density laser sensor data.

20 Claims, 7 Drawing Sheets

(51) Int. Cl.
*G01S 17/89* (2020.01)
*B64U 101/00* (2023.01)
*B64U 101/32* (2023.01)

(52) U.S. Cl.
CPC ...... *B64U 2101/00* (2023.01); *B64U 2101/32* (2023.01); *B64U 2201/20* (2023.01)

(58) Field of Classification Search
CPC ............... B64U 2101/30; B64U 20/87; B64U 2101/00; B64U 2101/32; G05D 1/0094; G05D 1/101; G05D 1/46; G05D 2109/20; G06T 2207/10028; G06T 17/00; G06T 7/73; G06T 7/70; G06T 2200/08; G06V 20/17; G06V 10/25; G06V 20/176; B60W 2420/408
See application file for complete search history.

(56) References Cited

U.S. PATENT DOCUMENTS

| | | | | |
|---|---|---|---|---|
| 2017/0345317 | A1* | 11/2017 | Heinonen | G06Q 10/06313 |
| 2019/0031342 | A1* | 1/2019 | Mitchell | B64U 30/29 |
| 2019/0118945 | A1* | 4/2019 | Loveland | G05D 1/0202 |
| 2019/0188337 | A1* | 6/2019 | Keane | G06Q 50/16 |
| 2019/0325614 | A1* | 10/2019 | Melkote Krishnaprasad | H04N 19/119 |
| 2021/0150771 | A1* | 5/2021 | Huang | G01S 17/89 |

OTHER PUBLICATIONS

Umeyama et al., "Least-Squares Estimation of Transformation Parameters Between Two Point Patterns", IEEE Transactions on Pattern Analysis and Machine Intelligence, vol. 13, No. 4, pp. 376-380, Apr. 1991.
"Software User Manual, Firmware v2.0.0 for all Ouster sensors," Ouster, pp. 1-116, Jan. 2021.
Bailey et al., "Simultaneous localization and mapping (SLAM): Part II", IEEE Robotics Automation Magazine, 13(3): pp. 108-117, Sep. 2006.
Besl et al., "A method for registration of 3-d shapes. IEEE Transactions on Pattern Analysis and Machine Intelligence", 14(2): pp. 239-256, Feb. 1992.
Durrant-Whyte et al., "Simultaneous localization and mapping: Part I", IEEE Robotics Automation Magazine, 13(2):pp. 99-110, Jun. 2006.
Severson et al, "Data-driven prediction of battery cycle life before capacity degradation" Nature Energy, 4: pp. 1-9, May 2019.

* cited by examiner

NEAR REAL-TIME RECONSTRUCTION USING DRONES

RELATED APPLICATION INFORMATION

This application claims priority to Provisional Application No. 63/003,378, filed on Apr. 1, 2020, incorporated herein by reference in its entirety.

BACKGROUND

Technical Field

The present invention relates to generating 3-dimensional (3D) model representations and more particularly to autonomous reconstruction of 3D models using an unmanned aerial vehicle (UAV) with light detection and ranging (LIDAR).

Description of the Related Art

The term 3-dimensional (3D) model covers a wide range of geometric representations of the surfaces of objects, from coarse-grained approximations (cylinders, cubes, intersection of planes), to more fine-grain representations such as meshes (small-scale surface tessellations that capture structural variations).

The accuracy of positioning determines model quality. Accuracy, the average distance between the position of a point in the model and the corresponding point on the surface relies on accurate positioning. Because unmanned aerial vehicles (UAV) (also called drones) can carry Global Positioning System (GPS) receivers, GPS can be used to position point clouds. However, GPS can be inaccurate, where GPS can have an average user range error (URE) of $\leq 7.8$ m (25.6 ft.), and be accurate to within a 4.9 m (16 ft.) radius under open sky, but accuracy decreases near buildings, bridges, and other objects. GPS errors can be several meters in obstructed settings, resulting in poor accuracy and completeness of a 3D model.

SUMMARY

According to an aspect of the present invention, a method is provided for automatically constructing a 3-dimensional model of a feature using a drone. The method includes generating a reconnaissance flight path that minimizes battery usage by the drone, and conducting a discovery flight that uses the reconnaissance flight path. The method further includes transmitting reconnaissance laser sensor data from the drone to a processing system for target identification, and selecting a target feature for 3-dimensional model construction based on the reconnaissance laser sensor data. The method further includes scanning the target feature using a laser sensor, transmitting laser sensor data for the target feature having a minimum point density from the drone to the processing system for 3-dimensional model construction, and constructing the 3-dimensional model from the minimum point density laser sensor data.

According to another aspect of the present invention, a system is provided for automatically constructing a 3-dimensional model of a feature using a drone. The system includes the drone, including onboard electronics and light detection and ranging (LIDAR), and a computing system including, a trajectory planner configured to generate a flight trajectory for the drone that scans an entire area of interest and minimizes flight duration. The computing system further including a feature detector configured to identify individual visual features within a predefined area of interest, and a 3-dimensional Simultaneous Localization And Mapping (SLAM) configured to generate a 3-dimensional model of one or more identified visual features from received point cloud data. The computing system further including a drift estimator and recalibrator configured to estimate drift of the drone from an expected and/or intended position and calculate corrections to recalibrate a flight path of the drone.

According to yet another aspect of the present invention, a non-transitory computer readable storage medium comprising a computer readable program for automatically constructing a 3-dimensional model of a feature is provided. The non-transitory computer readable storage medium comprising a computer readable program can cause the computer to generate a reconnaissance flight path that minimizes battery usage by a drone, communicate a reconnaissance flight path for a discovery flight to the drone, and receive reconnaissance laser sensor data from the drone for target identification. The non-transitory computer readable storage medium comprising a computer readable program can also cause the computer to select a target feature for 3-dimensional model construction based on the reconnaissance laser sensor data, transmit coordinates for a scanning flight path for the target feature to the drone, receive laser sensor data for the target feature having a minimum point density from the drone for 3-dimensional model construction, and construct the 3-dimensional model from the minimum point density laser sensor data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
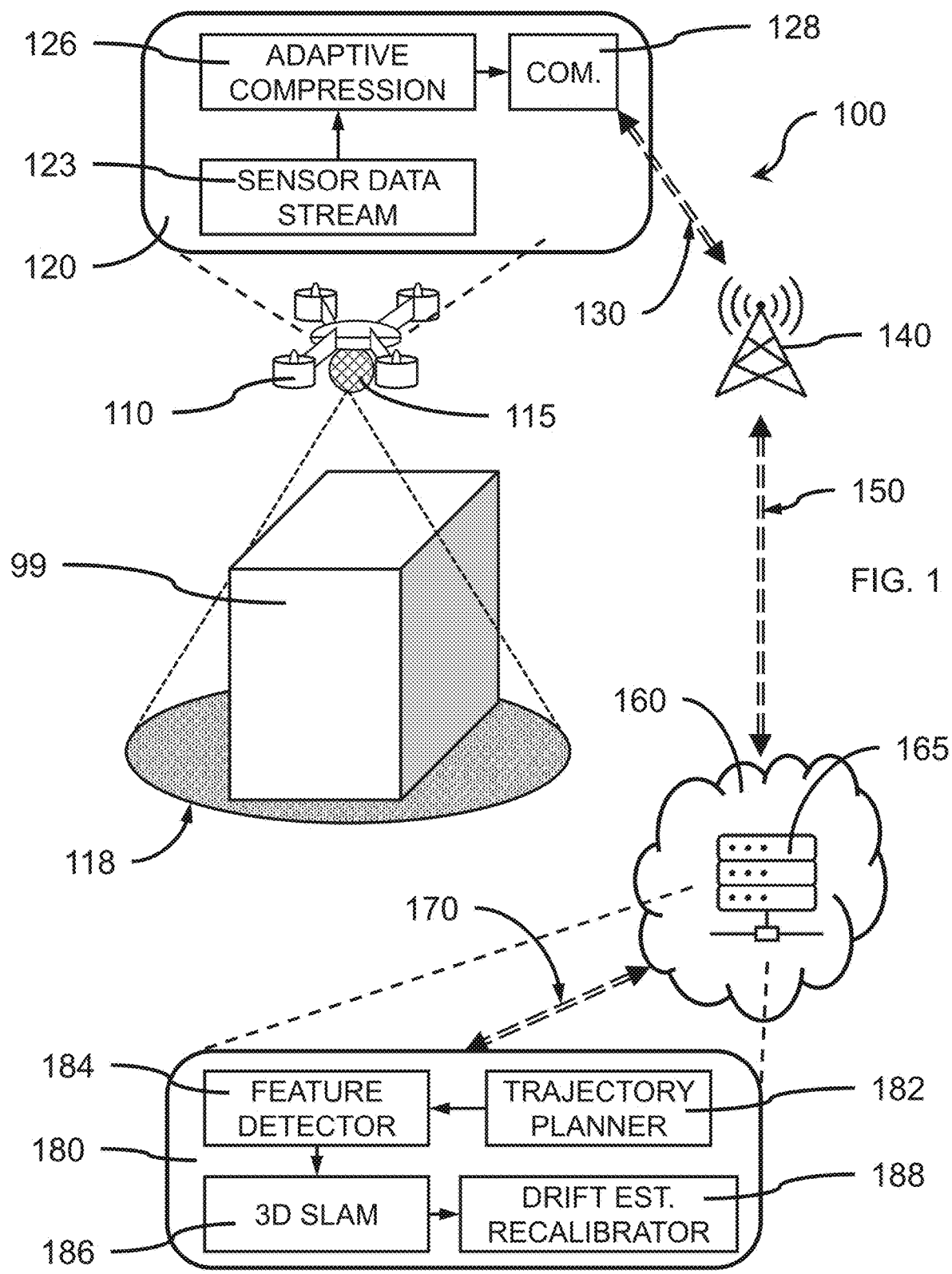
FIG. 1 is a diagram illustrating a high-level system/method for autonomous reconstruction of 3D models using a drone-mounted laser sensor, in accordance with an embodiment of the present invention.

In accordance with embodiments of the present invention, systems and methods are provided for preparing 3-dimensional (3D) reconstructions of visual features, including, objects, terrain, and/or structures by scanning using an unmanned aerial vehicle (UAV) (i.e., drones). The 3D Reconstruction can be autonomous and near real-time by communicating scan data to a remote processing center with greater computational power than available on-board a drone. LIDAR-based 3D models of environments can precisely capture point maps of large outdoor spaces.

In various embodiments, a drone can scan buildings and/or other objects using a laser sensor to collect data that can be used to construct an accurate 3-dimensional image/model of the building(s) or object(s) accurate, autonomous reconstruction of 3D models. In various embodiments, LIDAR (light detection and ranging) can be used to obtain the scan data, where LIDAR is an optical remote-sensing technique that uses laser light to scan/sample a surface to produce accurate measurements of the distance of the scanned surface(s) from a reference. Differences in return times and wavelengths of the light beam used for scanning can be used to make digital 3-D representations of the target building or object. The scan data can include absolute and/or relative positional information for points on the scanned surface.

In various embodiments, a drone can scan buildings and/or other objects using a drone-mounted LIDAR (laser sensor). Scanning can be used to document building construction or check aircraft integrity between flights. 3D models can be used in animations in films and video games, for preserving historical and tourist sites, for archaeology, city planning, and to capture buildings or rooftops for repair and solar installation, and as inputs to immersive virtual reality (VR) applications.

In various embodiments, each 3D reconstruction task maximizes an objective function that prioritizes certain features within an area of interest.

In various embodiments, the autonomous solution can employ an online method to evaluate the correctness, completeness, and fidelity of the 3D model.

Simultaneous Localization And Mapping (SLAM) algorithms can provide accurate pose (i.e., position and orientation) estimates, which can be used to position point clouds. "Pose" refers to the position of the sensor in 3D space, as well as its orientation (i.e., the direction it is pointing at). With each revolution of the LIDAR sensor, a point cloud (also referred to as a LIDAR frame) is returned. These algorithms use scan or feature matching techniques to align consecutive LIDAR frames to determine the pose of the drone throughout its flight.

In various embodiments, scan matching uses techniques to find the closest match for each point in the source point cloud A to a point in the reference point cloud B. It then estimates the coordinate transformation (e.g., translation and rotation) that best aligns each point in A to its corresponding point in B. By repeating this process across consecutive LIDAR frames, SLAM can position each frame in the first frame's coordinate frame of reference.

Reconstruction quality is dependent on the design of the drone trajectory. Reconstruction using SLAM from a poorly planned drone flight can be visually worse than GPS-based reconstruction because the underlying SLAM algorithm is unable to track LIDAR frames (i.e., it is unable to match points in successive point clouds). SLAM algorithms accumulate drift, so position estimates also can degrade on longer flights.

The computational capability of a drone can be insufficient to run SLAM.

Drones have limited flight endurance. When fully loaded and starting from a full charge, the drone may fly for approximately 25 minutes. This necessitates careful trajectory planning to minimize flight duration. Scan coverage can also be maximized.

The design of model collection trajectories may navigate the competing constraints of accuracy and battery life. Model collection uses SLAM, and SLAM error is sensitive to how the LIDAR is mounted, how fast and at what height the drone flies. Faster, higher flights use less of the drone's battery, but can incur high SLAM error. The converse is true of slower and lower flights. The 3D model Reconstruction System 100 (referred to as "DART") can find a sweet spot in this trade-off space to balance the accuracy goals with the drone battery usage.

In various embodiments, excessive drift can be detected and corrected for in real-time. An algorithm can track consistency between GPS traces and SLAM positions to detect excessive drift. A re-calibration step can be utilized to correct for detected drift while the drone is in flight.

Even with efficient model collection trajectories, scans over large areas can exhaust a drone's battery.

In various embodiments, a robust and efficient geometry extraction algorithm can focus model collection on a building or region of interest to plan the model collection trajectories.

In various embodiments, a fine-grain point-cloud of a building which consists of dense points on the surface of the building can be constructed. Each point has an associated 3D position, together with other attributes (depending on the sensor used to generate the point-cloud). The point-cloud based 3D model can generate the other representations.

In various embodiments, in theory there is no limit to the size of the building being scanned; however, in practice, scans are limited by battery life of the drone. To a first approximation, drone battery usage increases with flight duration. The 3D model reconstruction system 100 algorithm aims to maximize the size of the building that can be scanned with a given battery endurance.

In various embodiments, a processing pipeline can offload computation to a remote processor (e.g., cloud server) by compressing point clouds on the drone to the point where they can be transmitted over a communication path (e.g., "Long-Term Evolution" (LTE) standard for wireless broadband communication), and leverage GPU acceleration to process these point clouds in near real time at the LIDAR frame rate and with a minimal end to end processing delay. In various embodiments, the model can achieve 21-30 cm reconstruction accuracy even after compressing the raw sensor data by almost two orders of magnitude. This can make the model faster than an offline approach, and also more accurate, since an offline approach cannot re-calibrate mid-flight. In various embodiments, a complete 3D model reconstruction system 100 implementation is able to stream compressed point clouds over a LTE network and deliver a 3D model about 100 milliseconds (ms) after flight completion. The reconstruction system's 100 choice of trajectories drains the battery least while achieving the accuracy target, and its pipeline can process frames at 20 fps while incurring a processing latency of less than 100 ms. Reconstruction System 100 demonstrates on-line, cloud-based, autonomous, sub-meter, 3D model reconstruction in near real-time. Computational latency can be less than 10 milliseconds (ms).

Because drone-based 3-D reconstruction is a complex multidimensional problem, focus can be on a geometrically regular, but important, subset of structures for reconstruction: buildings.

It is to be understood that aspects of the present invention will be described in terms of a given illustrative architecture; however, other architectures, structures, materials, and process features and steps can be varied within the scope of aspects of the present invention.

Referring now in detail to the figures in which like numerals represent the same or similar elements and initially to FIG. 1, a high-level system/method for autonomous reconstruction of 3D models using a drone-mounted laser sensor is illustratively depicted in accordance with one embodiment of the present invention.

In one or more embodiments, a 3D model reconstruction system 100 (also referred to as "DART") can include a drone 110 with a laser sensor 115 attached to the drone 110, where the laser sensor is LIDAR. The laser sensor 115 can be used to scan and image a visual feature 99, including, objects (e.g., blimp(s), plane(s), ship(s), rocket(s), etc.), terrain (e.g., hill(s), mountain(s), ridge(s), canyon(s), crevasse(s), boulder(s), forest(s), etc.), and/or structures (e.g., building(s), dam(s), bridge(s), tower(s), crane(s), pyramid(s), stadium(s), statue(s), etc.) for 3-dimensional (3D) reconstruction. The visual feature 99 can be at least partially in a scanning field 118 of the laser sensor 115 performing the scan.

Wavelengths of the scanning light for the laser sensor 115 can be in the range of about 10 micrometers (infrared) to about 250 nanometers (UV), or about 2.5 micrometers (um) to about 500 nanometers (nm), or about 1 μm to about 550 nm, or about 865 nm, although other wavelengths are also contemplated.

In various embodiments, reconstruction system 100 splits its functionality across two components: (a) a lightweight subsystem that runs on the drone, and (b) a cloud-based component that discovers buildings, generates drone trajectories, and reconstructs the 3D models on-the-fly (in almost real time).

In various embodiments, the laser sensor 115 can generate a sensor data stream 123 that can be processed by onboard electronics 120, including, but not limited to, hardware, software, and/or firmware, that can provide avionics (e.g., flight control), communications (e.g., radio, WiFi, etc.), positioning (e.g., global positioning system (GPS), processing (e.g., CPU, GPU), and/or data/program storage (e.g., ROM, RAM, Flash, hard drive, etc.)), where the onboard electronics 120 can be, for example, a single board computer. The sensor data stream 123 can be generated by the laser sensor 115, for example, LIDAR, which is in communication with the onboard electronics 120.

In various embodiments, the sensor data stream 123 can be compressed 126 for communication, for example, by wireless telecommunication 130 (e.g., 4G, 5G, LTE) from the drone 110 to a communication platform 140, for example, a cellular tower, radio transceiver, wireless network interface (e.g., wireless modem/access point/hub), etc., through a communication interface 128.

In various embodiments, the data compression scheme/algorithm used for the data compression 126 can be, for example, an octree compression algorithm or point cloud clustering that can be used for 3D point cloud data compression. A point cloud can be composed of a very large number of points (e.g., tens to hundreds of thousands of points) covering a large area (e.g., tens to hundreds of square meters ($m^2$)) that capture detailed geometric information of a scanned feature. Structured point cloud data can be formed into a range image, where pixel data captured by LIDAR for a range image indicates the distance from the object to the LIDAR.

In various embodiments, the compressed data can be communicated to a processing system 165, where the processing system 165 can be in the cloud 160 or at another remote location, for example, a business headquarters, processing center, or research center. The communication can be transmitted 150 over a wired (e.g., conductive, fiber optic) and/or wireless (e.g., microwave, satellite, radio, etc.) communication path/channel, where the path/channel can be, for example, a packet-switched network (e.g., internet). The processing system 165 can be, for example, a server, a server farm, data center, etc.

In various embodiments, almost all of the CPU and GPU computing tasks can be performed in the cloud 160, thus enabling the UAV to operate with minimal computing and sensing hardware to reduce the drone weight and extend its flight duration.

In various embodiments, a cloud-based processing system 165 discovers buildings, generates drone trajectories, and reconstructs the 3D models on-the-fly. The cloud component can generate an efficient reconnaissance trajectory over the area of interest to discover the rooftop geometry of buildings.

In various embodiments, the processing system 165 can include a computing system 180 that can provide trajectory planning by a trajectory planner 182, feature detection by a feature detector 184, 3D Simultaneous Localization And Mapping (SLAM) 186, and drift estimation and recalibration by a drift estimation recalibrator 188. The computing system 180 can be, for example, a blade server, a rack-mounted server, one or more central processing unit(s) (CPUs) and/or graphics processing unit(s) (GPUs) with associated memory, a virtual machine (VM) running on the processing system 165, etc.

In various embodiments, the computing system 180 receives 170 the sensor data stream 123 transmitted over a wired (e.g., conductive, fiber optic) and/or wireless (e.g., microwave, satellite, radio, etc.) communication path/channel 150.

In various embodiments, a trajectory planner 182 uses: a) dimensions of the scan area, b) the estimated height(s) of the building(s) in the scan area, and c) the on-board laser sensor 115 properties to generate a flight trajectory for the drone 110 that scans the entire area of interest and minimizes flight duration. The reconnaissance flight can be an optimized flight path for the drone 110 that minimizes flight time to minimize the energy drain on the UAV battery.

In various embodiments, a feature detector 184 can identify individual visual features within a predefined area of interest, and provide location and size data for each of the identified visual features. The visual features can be identified based on a user specified parameter that ranks feature aspects, for example, size, GPS location, and/or other criteria, such as social importance, visitor popularity, architectural importance, etc.

In various embodiments, SLAM (Simultaneous Localization And Mapping) 186 can generate a 3D model of one or more identified visual features from received point cloud data. The point cloud data can be collected by the laser sensor 115 of the drone 110, and transmitted 150 to the processing system 165 and computing system 180. SLAM can estimate point cloud poses, and composes the received point clouds into the 3D model, for example, or a building.

In various embodiments, a drift estimation recalibrator 188 can estimate drift of the drone from an expected and/or intended position and calculate corrections to recalibrate the drone's 110 flight path to correct for such errors and improve the collection of point cloud data.

In various embodiments, during a reconnaissance flight before model collection, a fast, high flight that can minimize drone flight duration can extract the building geometry without constructing the 3D model; by detecting planar surfaces, and estimate building height and boundaries from the plane surface forming the rooftop. The "plane fitting" step can be used in the search for buildings, since buildings typically have flat (i.e., planar) surfaces.

In various embodiments, the information in the sensor data stream comes from a reconnaissance flight that scans an area for visual features and transmits the collected data to the processing system 165. The transmitted data from the scan can be analyzed to detect one or more features of interest.

In various embodiments, the processing system 165 can transmit 150 information and/or instructions over the communication path/channel and wireless telecommunication 130 to the drone 110, where the information and/or instructions can inform the drone of a flight path to take for scanning an area and/or one or more visual feature(s) 99 detected in the scanned area. The information can include topographical information, GPS coordinates, flight path instructions, and information on other drones in the area to facilitate cooperative scanning and collision avoidance.

In various embodiments, 3D model reconstruction system 100 streams compressed point clouds to a cloud service during flight over a cellular long-term evolution (LTE) connection.

The cloud service can extract the geometry, and prepare a more careful model collection trajectory that designs a minimal duration flight, while ensuring high 3D model accuracy. Given the building geometry, reconstruction system 100 designs a model collection trajectory to capture the 3D model of the building. During this second flight, the drone also streams compressed point clouds, and the cloud service runs SLAM to estimate point cloud poses, and composes the received point clouds into the building's 3D model. Mid-flight, the cloud service may re-calibrate the trajectory dynamically to minimize drift accumulation.

Figure 2:
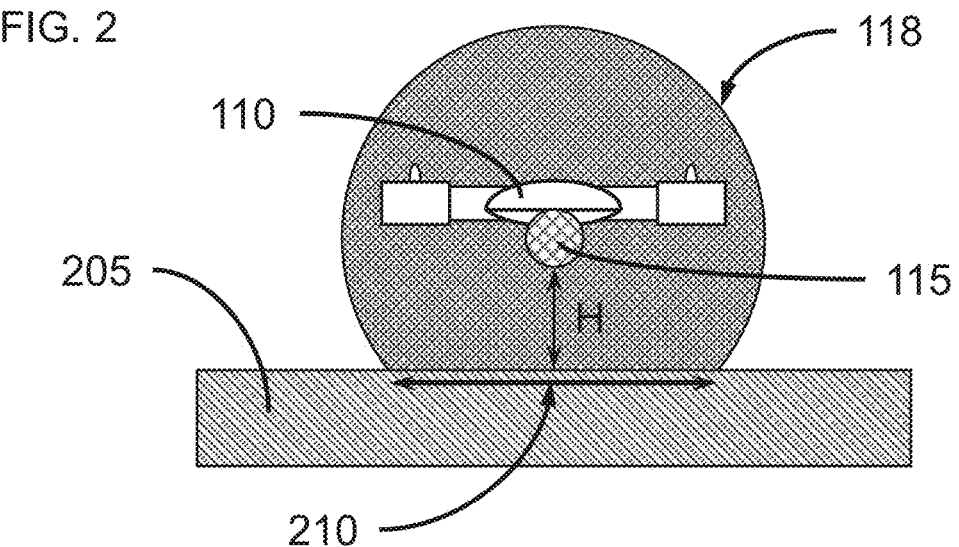
FIG. 2 is a diagram illustrating a scanning field and coverage distance for the laser scanner, in accordance with an embodiment of the present invention.

FIG. 2 is a diagram illustrating a scanning field and coverage distance for the laser scanner, in accordance with an embodiment of the present invention.

In various embodiments, the LIDAR is mounted sideways, hence part of the 360-degree field of view (FoV) is pointed up at the sky, and thus is not used for scanning. The effective FoV for the scanning field 118 is the area that is actually used for scanning the area below or in front of the drone, and is dependent on the altitude of the drone above the ground 205 or feature 99.

In various embodiments, the scanning field 118 of the laser scanner 115 encompasses a conical region that intersects the ground 205 from a height, H, and covers a horizontal distance, D, represented by the chord having endpoints on the circular cross-section of the scanning field 118. While FIG. 2 illustrates a flat surface for the ground 205, the scanning field 118 can cover a non-uniform surface with different elevations and containing features with different heights. A portion of the scanning field 118 may be directed at regions of the sky that can later be excluded from the data and analysis. In various embodiments, the scanning field 118 of the LIDAR has a cylindrical shape.

Figure 3:
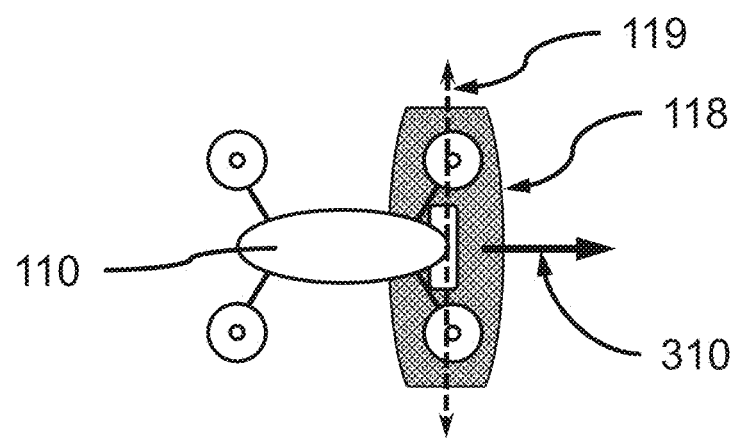
FIG. 3 is a diagram illustrating a scanning field oriented perpendicular to the drone's direction of travel, in accordance with an embodiment of the present invention.

FIG. 3 is a diagram illustrating a scanning field oriented perpendicular to the drone's direction of travel, in accordance with an embodiment of the present invention.

In various embodiments, the laser sensor 115 (LIDAR) can have a perpendicular orientation in which a long axis (scan plane 119) of the LIDAR scanning field 118 is across the drone's trajectory 310 and is perpendicular to the direction of the drone's travel. The vertical coverage distance refers to the distance covered by the vertical FoV of the LIDAR. For example, a LIDAR mounted "upright" on the ground. The vertical coverage distance is determined by the vertical FoV (field of view) of the LiDAR. When it is mounted on the drone, the LiDAR can be rotated 90-degrees, but the same terminology is used for consistency.

Figure 4:
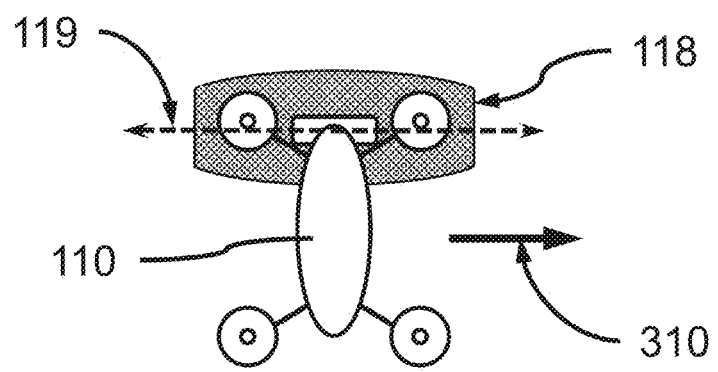
FIG. 4 is a diagram illustrating a scanning field oriented parallel to the drone's direction of travel, in accordance with an embodiment of the present invention.

FIG. 4 is a diagram illustrating a scanning field oriented parallel to the drone's direction of travel, in accordance with an embodiment of the present invention.

In various embodiments, the LIDIAR can have a parallel orientation in which a long axis of the LIDAR scanning field 118 aligns with the drone's trajectory 310 and is parallel to the direction of the drone's travel. A parallel orientation of the LIDAR in which the scan plane 119 aligns with the drone's trajectory, results in higher overlap between two successive point clouds than with a perpendicular trajectory at the same height and speed, thereby achieving a lower SLAM error and better accuracy. A parallel orientation (0°) has a longer visibility lifespan and a lower SLAM error. As overlap decreases, SLAM's positioning error can increase.

The parameter space refers to the altitude, speed, trajectory of the drone, and orientation of the flight (which affects the LIDAR orientation used in scanning. In a non-limiting exemplary embodiment, reconstruction system 100 uses careful trajectory design to find a sweet spot in this constraint space and a fast reconnaissance flight to narrow the search area for structures, and offloads SLAM to the cloud by streaming compressed LIDAR data over LTE.

The point cloud is a set of 3D data points, each corresponding to a distance measurement of a particular position of the surrounding environment from the LIDAR. To reconstruct a structure, such as a building, it suffices, in theory, to merge points clouds captured from different locations around the building. To understand what it means to merge point clouds, consider two successive clouds p and p'. A point x on the surface of the building may appear both in p and p'. However, since the drone has moved, this point x appears at different positions (relative to the LIDAR) in the two point clouds. If both point clouds could be precisely transformed to the same coordinate frame of reference, then the union of points in p and p' constitutes part of the 3D model of the building.

Figure 5:
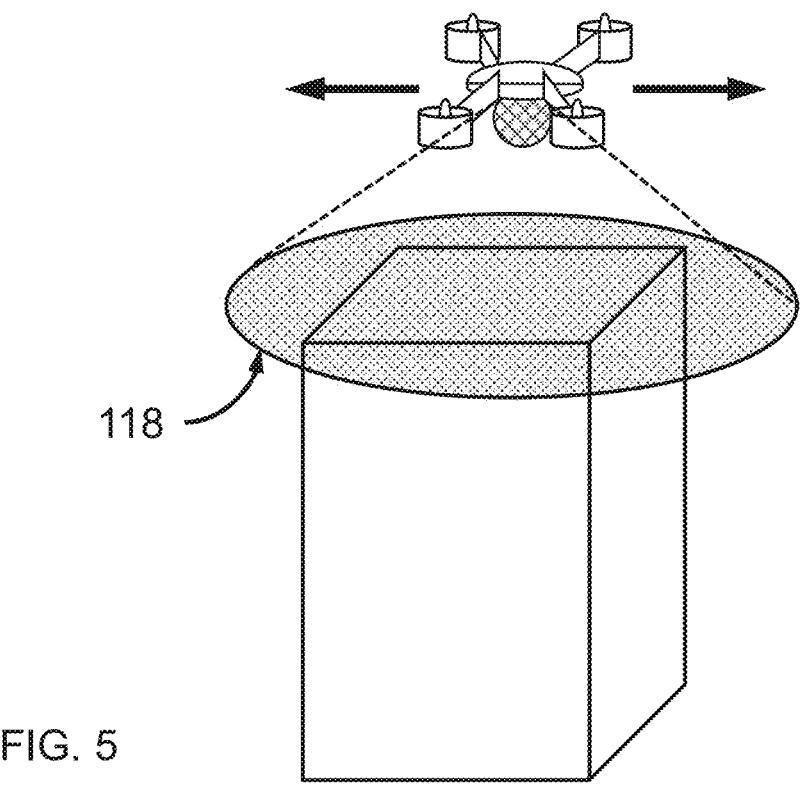
FIG. 5 is a diagram illustrating a drone travelling over an upper surface (e.g., roof) of a structure, in accordance with an embodiment of the present invention.

FIG. 5 is a diagram illustrating a drone travelling over an upper surface (e.g., roof) of a structure, in accordance with an embodiment of the present invention.

In various embodiments, during a reconnaissance flight, an algorithm can extract a building geometry without constructing the 3D model. The algorithm can rely on detecting planar surfaces by using the consistency of surface normals across points on a plane, then estimating a building height and boundary from the plane forming the rooftop. An efficient reconnaissance trajectory over the area of interest can discover the rooftop geometry of buildings.

Figure 6:
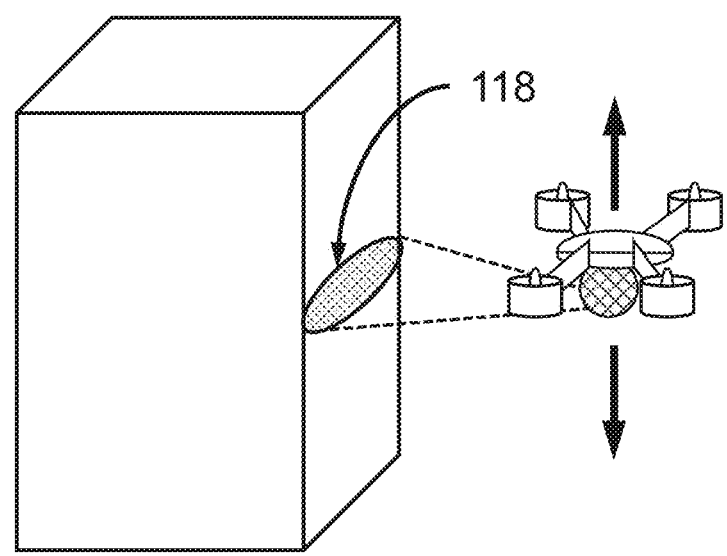
FIG. 6 is a diagram illustrating a drone travelling over a side surface (e.g., wall) of a structure, in accordance with an embodiment of the present invention.

FIG. 6 is a diagram illustrating a drone travelling over a side surface (e.g., wall) of a structure, in accordance with an embodiment of the present invention.

The drone's path should ensure coverage of the building's rooftop and sides. A more careful model collection trajectory that designs a minimal duration flight while ensuring high 3D model accuracy. The drone can move up/down on each face to capture the walls uniformly. In various embodiments, the drone can have a position diagonally displaced from a top edge of a building, where the drone is above and to the side of the building, such that the LIDAR can include both the roof and a sidewall in the scan.

Figure 7:
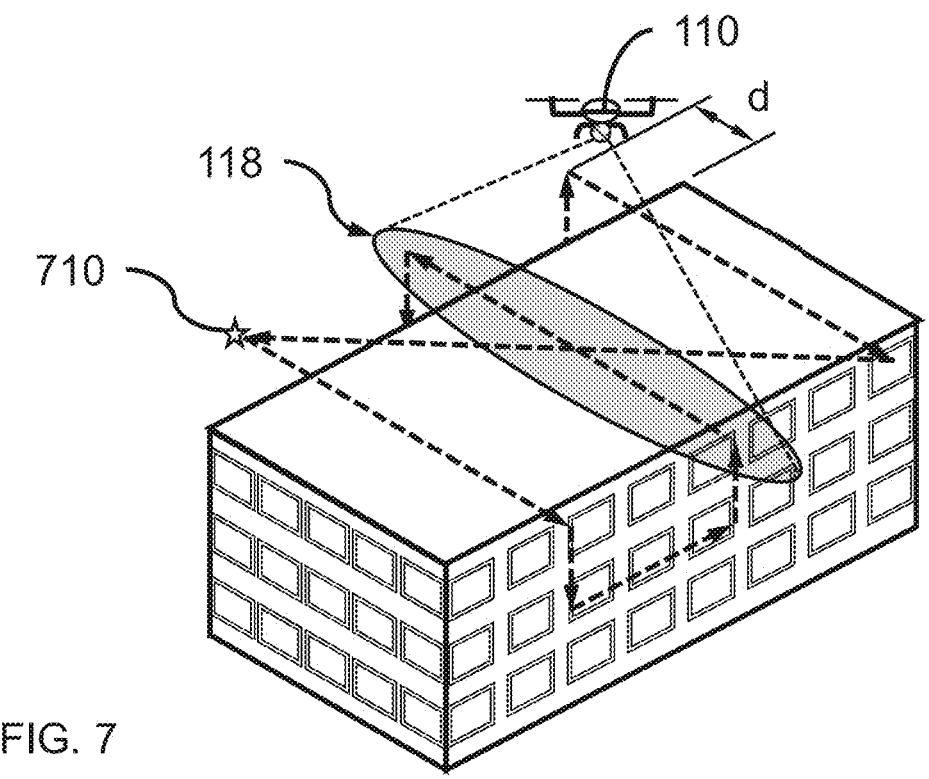
FIG. 7 is a diagram illustrating a drone performing a 3D reconstruction scan of a structure using a lateral flight path, in accordance with an embodiment of the present invention.

FIG. 7 is a diagram illustrating a drone performing a 3D reconstruction scan of a structure using a lateral flight path, in accordance with an embodiment of the present invention.

In various embodiments, the reconstruction system's 100 model collection trajectory starts from an origin 710, where this point defines the origin of the coordinate system for the resulting 3D model, then laterally traverses the building to capture the two sides of the building. The drone's flight path can extend a distance, d, beyond the building edges to account for errors in building geometry estimation. As it moves to each side laterally, it moves up/down on each face to capture them uniformly at the same minimum point density. Then, the drone returns to the origin, and traverses longitudinally. This loop closure maneuver can allow SLAM to correct for drift.

Figure 8:
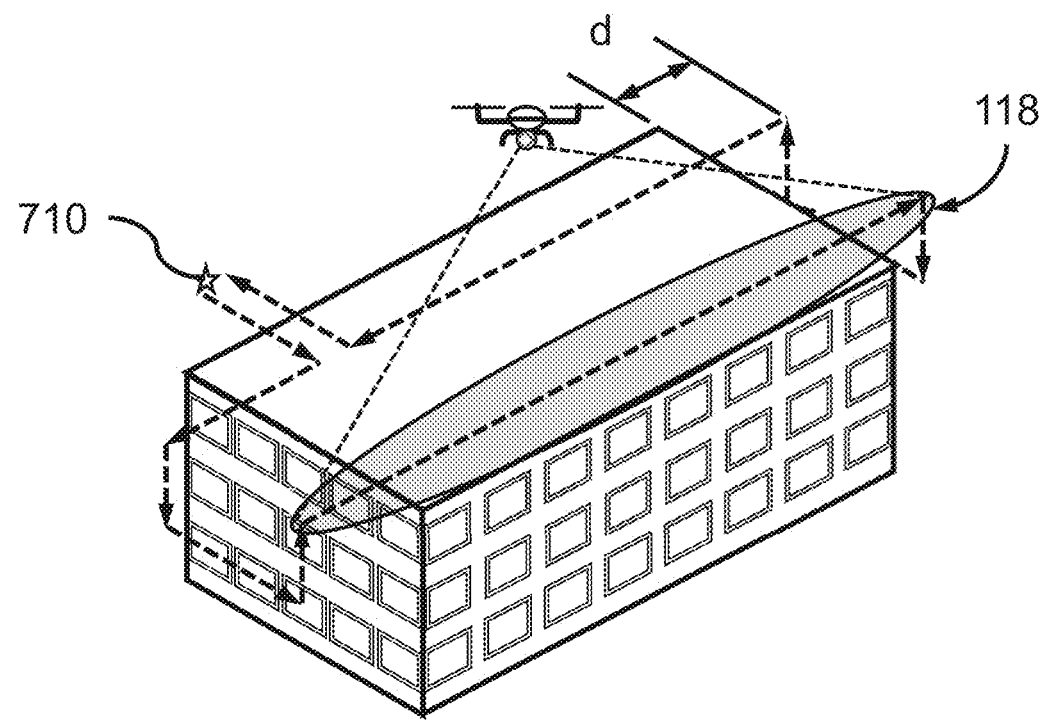
FIG. 8 is a diagram illustrating a drone performing a 3D reconstruction scan of a structure using a longitudinal flight path, in accordance with an embodiment of the present invention.

FIG. 8 is a diagram illustrating a drone performing a 3D reconstruction scan of a structure using a longitudinal flight path, in accordance with an embodiment of the present invention.

In various embodiments, the lateral and longitudinal flight segments have the same drone orientation.

In various embodiments, reconstruction system 100 can use return-to-origin to re-calibrate SLAM drift. The second, longitudinal, flight starts a new SLAM session; to "stitch" the two sessions together, reconstruction system 100 can compute a transformation matrix that transforms the coordinate system of the first session to that of the second. The reconstruction system 100 can use various techniques for this. More important, reconstruction system 100 designs the longitudinal flight to start close to the origin, which has two benefits: (a) shorter flight time resulting in lower overall energy consumption and (b) less drift accumulation.

Return-to-origin re-calibration might also be utilized in the middle of one of the flights if the environment is sparse and SLAM tracking fails. In that case, the flight resumes at the point at which it detected excessive drift: the direct path from the origin to that point is always shorter than the initial segment, ensuring that the resumed flight starts with a lower drift.

Detecting excessive drift is non-trivial, since reconstruction system 100 has no way of knowing when SLAM's position estimates are wrong, because it does not have accurate ground truth. The 3D model reconstruction system 100 leverages the GPS readings associated with SLAM poses: each sequence of readings gives a GPS trajectory, and the reconstruction system 100 attempts to find the best possible match between the GPS trajectory and the SLAM-generated trajectory. If there is a significant deviation, reconstruction system 100 assumes there is a drift and invokes re-calibration.

Accurate reconstruction requires high drone positioning accuracy, and, because GPS can be inaccurate, reconstruction system 100 uses SLAM. Errors in the reconstructed building model can be within 10 s of centimeters (e.g., 10 cm to 50 cm) of its true dimensions.

In a non-limiting exemplary embodiment, a 64-line LIDAR, with 2048 points per line for a total of 131702 points per scan is used. The LIDAR operates at 10 Hz, or 10 scans per second. When in operation, the LIDAR can send data to the drone at 129.13 Mbps. The drone can fly up to 400 ft and 10 m/s, however, slower speeds can be used when scanning.

In various embodiments, the individual LIDAR scans are aligned and "appended" together to form a 3D model of the scanned area. This is also known as Simultaneous Localization And Mapping (SLAM). "Scan matching" refers to this step of aligning LIDAR frames/scans and figuring out how they fit together to form a larger 3D map. A 3-D point cloud model or a LIDAR frame can be created for a building or other object.

In various embodiments, two metrics, accuracy, and completeness, can be used to determine the quality of the 3D model and reconstruction. Accuracy is the Root Mean Square Error (RMSE) of the distance from each point in 3D model, M, to the nearest point in ground-truth, $M_g$. A ground truth, Mg, can be obtained using actual building plans and extremely accurate, survey-grade measuring hardware and software. Completeness is the RMSE of the distance from each point in Mg to the nearest point in M. If both values are zero, M perfectly matches Mg. If M captures all points in Mg, but the positions of the points are erroneous, then both accuracy and completeness will be non-zero. If M captures only one point in Mg, but positions it correctly, its accuracy is perfect, but completeness is poor. The trajectory of the drone flight can impact 3D model completeness and accuracy, in part because a poorly designed trajectory can increase SLAM error.

In designing the drone's trajectory, 3D model reconstruction system 100 can control the following parameters: the actual path of the drone over the building, its speed, its height, and the orientation of the LIDAR with respect to the ground. These parameter choices can have a qualitative impact.

Orientation can impact accuracy. Different orientations can have different degrees of overlap, and as overlap decreases, SLAM's positioning error increases. At a fixed height and speed, a parallel orientation of the LIDAR in which its scan plane aligns with the drone's trajectory, results in higher overlap between two successive point clouds than with a perpendicular trajectory, therefore, lower SLAM error and better accuracy. A parallel orientation (0°) has the lowest SLAM error because it has the highest visibility lifespan. (Visibility lifespan, the time for which a point on the building's surface is visible during flight, is a proxy for overlap; a longer lifespan indicates greater overlap).

Speed can impact model accuracy. If the drone flies fast, two successive point clouds will have fewer overlapping points resulting in errors in the SLAM's pose transformations and (therefore) pose estimates, which leads to poor 3D model accuracy. "Pose" is a technical term that refers to the position and orientation of the drone. In various embodiments, the drone is controlled to fly as slow as possible.

Height can impact both accuracy and completeness. Because LIDAR beams are radial, the higher a drone flies, the less dense the points on the surface of the building. Lower density results in worse completeness. Accuracy is also worse, because the likelihood of matching the same point on the surface between two scans decreases with point density. For example, the positioning errors for point densities of 2.2 points per m² and 3.0 points per m² are 2.5 m and 1.0 m respectively. In various embodiments, the drone is controlled to fly as low as possible. The minimum point density laser sensor data can have a point density in a range set by the user. A user can also set a minimum error.

In various embodiments, the drone's path is chosen to ensure coverage of the building's rooftop and sides. The drone must fly several times over the building to capture all its surfaces. If it flies low, slowly, and at a parallel orientation, the flight duration can be significant. Over long durations, SLAM accumulates drift, which can worsen model accuracy and completeness.

In various embodiments, reconstruction system 100 designs equi-dense trajectories to control model completeness, and uses offline data-driven parameter estimation to find the choice of speed, height, and orientation. To minimize drift accumulation, reconstruction system 100 performs online drift estimation and re-calibration. An equi-dense trajectory ensures that the resulting model is (a) complete, and (b) captures the building with a point density that is no less than the specified minimum target point density, d.

Point density can depend on LIDAR parameters and height. The height (more generally, distance for vertical surfaces like the sides of the building) at which a LIDAR flies from a surface governs the average density of points it obtains from that surface; larger heights result in lower point density.

For a given LIDAR configuration, the point density can be computed as a function of height. For example, for a LIDAR with 64 beams, horizontal resolution of 1024, and a vertical field of view of 45°, to a first approximation, two consecutive beams are at an angular separation of 0.7° (45/64) and lasers from same beam are 0.35° (360/1024) apart. Using geometry, for a surface at a distance h from the drone, we can compute the projection of the LIDAR on that surface. Using this projection, we can compute the point density throughout the whole point cloud. Central regions of the point cloud have much higher density than regions at the extremities.

Coverage can depend on height. The density of points at which a drone captures a surface depends on its height h. In general, the drone can only capture a subset of this full coverage region with a minimum target point density, $P_{dmin}$, (shown by target density region). Now, suppose the drone's trajectory performs a rectilinear scan over the surface. Then, to ensure that reconstruction system 100 captures the entire surface at least at a density d, the scan width must be equal to or smaller than the width of the target density coverage region.

In various embodiments, reconstruction system 100 can estimate scan width from the LIDAR parameters. To estimate the width of the target-density coverage region, reconstruction system 100 can use the LIDAR parameters, and model the LIDAR geometry, to derive a function which returns the scan width for a given target density d, and a given height, h. It models the beams of the LIDAR as having equal angular separation, so it can compute the points at which these beams intersect with the plane at a height (or distance) h away. Given a target point density, $P_{dtar}$, reconstruction system 100 can compute the largest width at this height that will ensure minimum point density, $P_{dmin}$.

In various embodiments, the 3D model reconstruction system 100 uses a fixed orientation, height h and speed for the drone's flight; it selects these parameters using an offline data-driven approach. LIDAR orientation, and drone height, and speed can determine how well SLAM can estimate positions to ensure accuracy and completeness.

LIDAR orientation, and drone height, and speed can determine how well SLAM can estimate positions to ensure accuracy and completeness for a building shaped like a rectangular solid.

Offline simulations can be used to estimate parameters, where parameter space can be explored using the simulation. A game engine driven photorealistic simulators like AirSim can be used to sweep the space of parameters. There exists a sweet spot in the parameter space that ensures high accuracy and completeness while minimizing flight duration. In various embodiments, a parallel orientation, while flying at a distance of 20 m from the surface (or lower, if necessary, to meet the point density constraint) at 1 m/s gives the best accuracy. Using these parameters, and given the building geometry and the scan width, reconstruction system 100 can design a drone flight path.

This approach is robust to GPS errors, since it matches the shape of the two trajectories, not their precise positions. Specifically, reconstruction system 100 continuously executes 3D SLAM on the stream of compressed LIDAR frames from the drone, and estimates the pose of each frame. It synchronizes the GPS timestamps with the LIDAR timestamps, then transforms GPS readings using the Mercator projection. It then tries to align the GPS trajectory and the SLAM-generated trajectory using the Umeyama algorithm to determine the rigid transformation matrices (i.e., translation, and rotation) that will best align the SLAM and GPS poses. Reconstruction System 100 can partition trajectories into fixed length segments and after alignment, computes the RMSE between the two trajectories in each of these segments, and uses these RMSE values as an indicator of excessive drift: if the RMSE is greater than a threshold p, reconstruction system 100 invokes return-to-origin.

This approach can be generalized to other regular building geometries. It also generalizes to other structures that can be tightly bounded within rectangular solids, such as aircraft fuselages or blimps.

Given a region of interest, reconstruction system 100 conducts a reconnaissance ("recon") flight to determine the boundary of the building's roof. It uses this boundary for trajectory design. The recon flight helps reconstruction system 100 scope its model collection to the part of the region of interest that contains the building to reduce battery usage. For instance, if in a large campus, buildings occupy only a small fraction of the surface area, a fast recon flight can reduce overall drone battery consumption. In various embodiments, boundary estimation is robust to nearby objects like trees that can introduce error; and because buildings come in many shapes (e.g., rectangles, squares, hexagons etc.), the boundary estimation can generalize to these.

In various embodiments, similar to model collection, recon can use a rectilinear scan. Unlike model collection, however, during recon the drone can fly faster (e.g., 4 m/s) and higher (e.g., 60 m above the building's roof), with the LIDAR mounted in a perpendicular orientation in order to have the shortest duration flight possible. For example, with an Ouster®-64 LIDAR, and the ground coverage area as a function of height, the coverage is highest between 40 m and 60 m. At a given height, a perpendicular orientation covers a wider swathe of ground than a parallel orientation. This allows reconstruction system 100 to use a larger scan width, s, resulting in a shorter flight. As with model collection, during this flight, reconstruction system 100 streams point clouds to its cloud component, which runs the boundary detection algorithms.

This flight design poses two challenges for boundary detection. First, to detect the building's boundary, it is still necessary to align all point clouds to the same coordinate frame of reference. In recon, reconstruction system 100 cannot use SLAM because fast, high flights can cause SLAM to lose tracking frequently. Because boundary detection can afford to be approximate, GPS can be used. High and fast flights result in low point density, and boundary detection algorithms must be robust to this. reconstruction system 100's building boundary detection takes as input the area of interest and outputs the GPS locations that constitute the boundary of the building. Model collection can use these outputs.

In various embodiments, boundary detection can run two different algorithms: rooftop surface extraction, followed by boundary estimation. For surface extraction, the cloud component receives GPS-tagged compressed point clouds from the drone. It first uncompresses them, then computes the surface normal of every point in the point cloud. A surface normal for a point determines the direction normal to the surface formed by points within a fixed radius of the point. reconstruction system 100 can use a plane-fitting algorithm (e.g., a plane extraction (PE) method based on the random sample consensus (RANSAC) approach) to segment the LIDAR points into groups of points that fall onto planes. In each plane, reconstruction system 100 removes outlying points that are further away from neighboring points in the same plane using a statistical outlier filter. Using the statistical outlier on every point cloud can be computationally intensive. To this end, reconstruction system 100 can tune the statistical outlier's parameters to find a sweet spot between filtering accuracy and performance.

To find the rooftop among multiple detected planes, reconstruction system 100 can use the surface normals to compute surface statistics for each plane (e.g., plane height, 3D centroid, normal variance etc.). A GPU can be used to accelerate surface normal computation, which can be computationally intensive but parallelizable. reconstruction system 100 can use these statistics to find the rooftop in the extracted planes. Intuitively, for example, the rooftop would be a large, uniformly oriented surface (surface normal variance is low) that lies above the ground plane. reconstruction system 100 can eliminate the ground plane as that plane whose points are consistent with the drone's height. So, it discards all planes that do not satisfy this definition (this includes planes with high variances and the ground surface). At the end of the computation and analysis, reconstruction system 100 classifies a single plane as the roof surface.

In various embodiments, to remove the possibility of false positives, reconstruction system 100 can use majority voting to remove erroneous surface detections, where reconstruction system 100 classifies a plane as the rooftop only if it detects it in multiple consecutive frames. Lastly, even though the outlier filter removes small sets of outliers in planes, it is unable to remove large clusters of points belonging to objects like trees found nearby the building. For this, reconstruction system 100 forms clusters of points based on their spatial relationships such that neighboring points belong to the same cluster. This way, points belonging to different objects form clusters. Since the roof is normally a relatively larger surface, reconstruction system 100 simply discards smaller clusters. To do this in near real-time, reconstruction system 100 finds the right set of parameters for the clustering algorithm.

In various embodiments, reconstruction system 100 obtains parts of the rooftop from each point cloud. reconstruction system 100 can use the drone's GPS location to transform each surface to the same coordinate frame of reference, then combines all surfaces into a single point cloud that represents the extracted rooftop of the building. reconstruction system 100 encapsulates the extracted rooftop in a tight 3D rectangular bounding box. This allows reconstruction system 100's model collection trajectories to generalize of structures and buildings of various shapes. Finally, to detect the boundary of multiple buildings, reconstruction system 100 clusters the rooftop point clouds.

LIDARs generate dense point clouds at 10 frames a second. A 64-beam LIDAR, for example, generates raw streams that require 129.13 Mbps, well beyond the capabilities of even future cellular standards. reconstruction system 100 compresses these point clouds to a few Mbps, using two techniques: viewpoint filtering, and octree compression.

For viewpoint filtering, the LIDAR can have a 360° horizontal field-of-view (FoV) and a 45° vertical FoV. In a drone mounted LIDAR, a portion of the full 360° may contain useful information. Beams directed towards the sky, or towards objects beyond LIDAR range, generate zero returns. Viewpoint filtering removes the portions of the scanned field of view that do not contain useful information, and also removes returns (reflections) from the body of the drone. View-point filtering does not degrade accuracy since it omits zero returns.

For octree compression, reconstruction system 100 compresses the retained data using a standard octree compression algorithm designed specifically for point clouds, and therefore better than data-agnostic compression techniques, which can be after filtering the point cloud. reconstruction system 100 can choose different values of octree resolution and point resolution, two parameters that govern the compressibility of point clouds, to achieve point-cloud transmission rates of about 1.2 to about 4 Mbps, which is within the range of achievable LTE speeds.

In a non-limiting exemplary embodiment, reconstruction system 100 uses the Point Cloud Library (PCL), the Cartographer LIDAR SLAM implementation, the Boost C++ libraries, and the Robotic Operating System (ROS). Functions from the Point Cloud Library (PCL) can be used for plane-fitting, outlier removal, and clustering. Compression and extraction modules can use PCL and are implemented as ROS nodes. A drift detection module can use a Python package for the Umeyama alignment.

To evaluate the end-to-end performance of reconstruction system 100 in building an accurate 3D model in near real-time, 3D models of two buildings: a) a large 50 m×100 m×20 m (L×W×H) and, b) a small 50 m×50 m×20 m building were collected and reconstructed. The reconstruction accuracy of these models was compared with two baseline offline approaches (i.e., approaches that reconstruct the 3D model after the drone lands). The accuracy and completeness of the models generated by these approaches were calculated by comparing them against ground truth models generated from AirSim. reconstruction system 100 uses compressed point clouds with bandwidth requirements that are compatible with LTE speeds (e.g., upload bandwidth of 3.8 Mbps), such that the compressed point cloud bandwidth requirement is less than the bandwidth capacity of the long-term evolution (LTE) network.

In various embodiments, reconstruction system 100 achieves lower than 25 cm accuracy and completeness for both buildings and reconstructs the entire buildings in just 10-12 minutes (the flight duration). For reconstruction quality, reconstruction system 100 does much better than the two baseline approaches. Since Offline-shortest duration flight (SDF) does neither careful trajectory planning (TP) nor in-flight re-calibration, its accuracy and completeness values are very large. Offline-TP does better because it uses reconstruction system 100's trajectory planning, but still exhibits worse accuracy and completeness than reconstruction system 100 because it lacks in-flight calibration.

Though reconstruction system 100 uses compressed point clouds, with in-flight re-calibration and trajectory planning, reconstruction system 100's models are up to 3.5× more accurate and complete. Relative to a raw trace, compression accounts for 4-7 cm difference in accuracy and completeness. Moreover, reconstruction system 100 reconstructs while the drone is in-flight whereas the other two baseline approaches do reconstruction offline on uncompressed point clouds, incurring up to 4.6× higher reconstruction time. With an accuracy of 0.25 m (using 3.8 Mbps upload bandwidth), the model closely matches the ground truth, but the textured building surface shows some small artifacts.

reconstruction system 100 can accurately reconstruct a variety of building types. Larger buildings (pentagonal, plus, and H-shaped) have larger flight durations partly because of their size and because they require two re-calibration steps. Even then, for all buildings, reconstruction system 100 achieves tens of centimeter accuracy and completeness.

reconstruction system 100 has also modeled a blimp. reconstruction system 100 encloses such structures within an enclosing rectangular solid. reconstruction system 100 reconstructed the blimp with an accuracy of 23 cm and completeness of just 3 cm.

Figure 9:
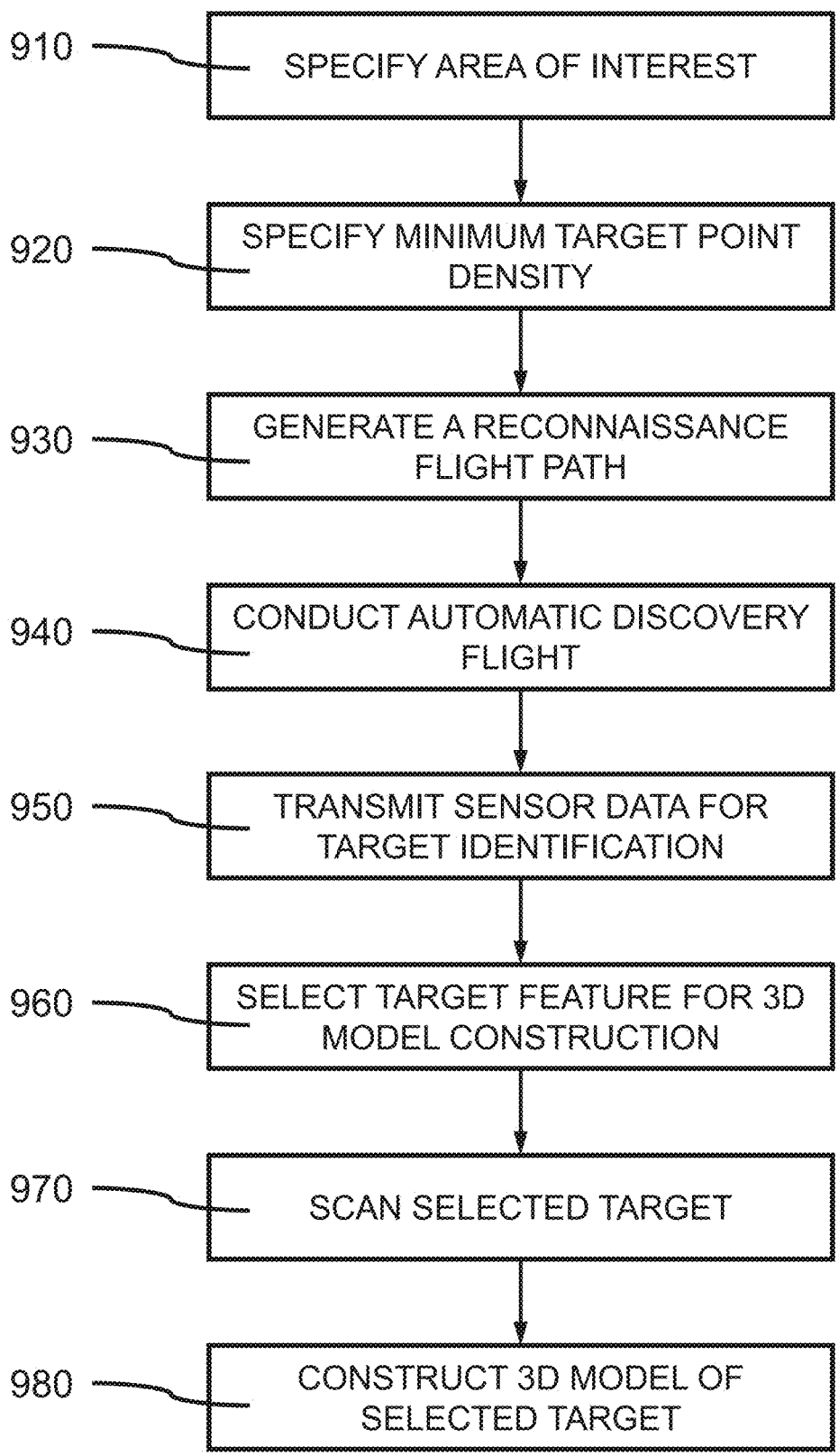
FIG. 9 is a block/flow diagram of a system/method for near real-time 3D reconstruction of a visual feature using a drone, in accordance with an embodiment of the present invention.

FIG. 9 is a block/flow diagram of a system/method for near real-time 3D reconstruction of a visual feature using a drone, in accordance with an embodiment of the present invention.

At block 910, a user specifies an area of interest.

In various embodiments, this is a user-specified parameter. It can be expected that a user will deploy the drone in a general area of interest that is defined very coarsely, e.g., an office complex.

At block 920, a minimum target point density is specified.

In various embodiments, minimum point density is a user-specified parameter.

At block 930, a reconnaissance flight path is determined.

In various embodiments, reconstruction system 100 builds flight paths by joining multiple linear sweeps/drone flights over the area. For buildings, this follows a flight template determined for the optimized lateral and/or longitudinal flight paths. For other non-rectangular structures, this would follow an exhaustive search of linear sweeps within an AirSim simulator.

At block 940 a drone automatically discovers buildings in the area of interest.

A fast, high flight that minimizes drone flight duration can extract the geometry of visual features without constructing a 3D model by detecting planar surfaces and boundaries from flat surfaces, for example the plane forming a rooftop. For a non-flat feature (e.g., blimp, plane, etc.), reconstruction system 100 aims to achieve equi-dense scans. This means that the drone will maintain a constant distance away from the target of the scan. For buildings, this is simple and can result in linear sweeps. For irregularly shaped objects, the drone can follow the curvature of the object during the scan.

At block 950, the drone can send the laser sensor data (i.e., LIDAR data) from the reconnaissance flight to a remote processing system for selection of a particular visual feature in the area of interest.

In various embodiments, "interest" is a user-specified parameter. The user is able to describe features such as "buildings", "store-fronts", "cars", "trucks" etc., and the drone will plan a trajectory through the objects of interest that are detected in the scene. The current instantiation is an example of how it can be done for buildings, but the same concept is generalizable to other visual features.

At block 960, one or more visual feature(s) are identified for 3D model construction. The information identifying the selected visual feature can be communicated back to the drone onboard electronics.

In various embodiments, based on the user-specified "interest" parameter, one or more visual feature(s) are identified for 3D model construction.

In various embodiments, each 3D reconstruction task maximizes an objective function that prioritizes certain features within an area of interest.

An objective function that can maintain equi-dense scanning coverage within the battery endurance is usable. Machine learning models can be used as the objective function.

At block 970, the drone performs a modelling flight to collect sufficient point cloud data to construct a 3D model of the selected visual feature with the remaining drone flight time.

At block 980 a 3D model of the selected target (e.g., building(s)) is/are constructed in near real-time (i.e., during the drone flight) while minimizing flight duration at that given minimum point density.

To validate that reconstruction system 100 can collect a 3D model end-to-end in near real-time, an embodiment of an implementation was used to conduct an experiment in which a mobile device streamed 10-12 minutes worth of compressed point clouds from a real-world trace, over an LTE connection. To compress point clouds, three different levels of compression (low, medium, and high), corresponding to the following combinations of octree resolution and point resolution (§ 2.3): (0.25, 0.10), (0.25, 0.25) and (0.50, 0.50) were used. At all three compression modes, reconstruction system 100 was able to stream point clouds in real time (Table 1), and the total end-to-end processing time per frame is about 110 ms, of which nearly 65 ms is network latency. Thus, reconstruction system 100 builds the 3D model whilst the drone is in-flight, adds a frame within 100 ms after receiving it and can make available a complete 3D model of a building in about a 100 ms after receiving the last frame.

TABLE 1

| COMPRESSION | LOW | MEDIUM | HIGH |
| --- | --- | --- | --- |
| UPLOAD BW (MBPS) | 3.80 | 2.50 | 1.27 |
| COMPRESSION TIME (ms) | 62.9 | 65.3 | 65.3 |
| NETWORK LATENCY (ms) | 15.5 | 14.6 | 13.7 |
| EXTRACTION TIME (ms) | 5.05 | 3.07 | 3.03 |
| SLAM TIME (ms) | 34.5 | 30.8 | 23.9 |
| TOTAL TIME (ms) | 117 | 113 | 106 |

MBPS = megabytes per second

Point cloud compression executes on the drone, and other components run on a server that can be in the cloud. During recon, point cloud compression takes 13 ms per frame. Extracting the building geometry requires 100 ms per frame. About 10 frames per second (fps) can be maintained. During model collection, SLAM requires 37 ms per frame, and 3D reconstruction requires about 10 ms. A moderately provisioned, cloud VM suffices to run reconstruction system 100 at full frame rate with an end-to-end compute latency of about 100 ms for reconnaissance, and 50 ms for model collection.

To show the effect of inflight re-calibration, we built online 3D models of the 7 large buildings mentioned above using reconstruction system 100 with (w) and without (w/o) re-calibration. In these experiments, we evaluate flight duration and reconstruction quality at low compression (3.8 Mbps upload bandwidth) using accuracy and completeness metrics. On average, at the expense of only 18% (150 seconds) longer flights, reconstruction system 100 improves accuracy by 65% (65 cm) and completeness by 55% (20 cm) with re-calibration flights. Larger buildings (plus-shaped, H-shaped, and pentagonal) require longer aerial flights which accumulate higher drift. This results in relatively more recalibration flights and hence higher flight duration. Even so, reconstruction system 100 is able to reconstruct these buildings accurately, demonstrating the importance of re-calibration.

reconstruction system 100 strives to reduce drone battery depletion in its design by generating short duration flights without sacrificing accuracy and completeness. To show that reconstruction system 100's defaults of 1 m/s speed and 40 m height represent the best point in this tradeoff space, we compare it to a lower, slower flight (30 m, 0.5 m/s), and a faster, higher flight (50 m, 2 m/s). On the large building the lower, slower flight has a longer trajectory, resulting in more re-calibrations. The resulting model has worse accuracy and completeness; re-calibration can limit drift error, but not reverse it.

A faster, higher flight has a slightly shorter trajectory, but the resulting model's accuracy is very poor, because there is less overlap between point clouds at higher speeds.

An exhaustive flight that uses the model collection parameters and does not perform recon is 3× longer than reconstruction system 100's flight (and accumulates significant drift, resulting in poor quality 3D models). View-point filtering does not degrade accuracy since it only omits zero returns. Low compression, with a bandwidth of 3.8 Mbps (easily achievable over LTE and over 100× more compact than the raw LIDAR output) only adds 4 cm and 5 cm to accuracy and completeness (respectively). Medium and high compression have significantly poorer accuracy and completeness. Similar results hold true for the other AirSim building, so we omit for brevity.

Lossless point cloud compression, which requires 7.86 Mbps bandwidth comes within 1 cm of the raw point cloud accuracy and completeness for the AirSim building and within 7 cm for the real-world building.

A parallel orientation of the LIDAR has lowest SLAM error (yaw 0° corresponds to parallel and yaw 90° to perpendicular), because it has highest overlap between successive frames; as yaw increases, overlap decreases, resulting in higher SLAM error.

Error increases slowly with height; beyond a 20 m distance from the building, the error is more than 1 m. This is because point densities decrease with height, affecting SLAM's ability to track features or points across frames. Rather than fly lower, reconstruction system 100 chooses to operate at a 20 m distance (or a 40 m height, since in our experiments buildings are 20 m tall) to reduce flight duration.

Beyond 1 m/s, SLAM cannot track frames accurately because of lower overlap between frames (§ 2.1). Below 1 m/s i.e., at 0.5 m/s, the flight duration (in seconds) is twice that of 1 m/s which results in drift error accumulation. To achieve accurate reconstruction, reconstruction system 100 chooses to fly the drone at 1 m/s. reconstruction system 100 chooses to fly slow, low, and with a parallel orientation.

Accuracy is the average (2-D) distance between each point (quantized to 0.1 m) on the predicted boundary and the nearest point on the actual building boundary. Completeness is the average distance between each point on the actual boundary and the nearest point on reconstruction system 100's predicted boundary. Lower values of accuracy and completeness are better.

For all building shapes, reconstruction system 100 accurately (to within 2.5 m) extracted the boundary of the building even when using high compression at 10 Hz (i.e., every other point cloud). The average accuracy is then 1.8 m and completeness is less than 2.0 m for all buildings.

Figure 10:
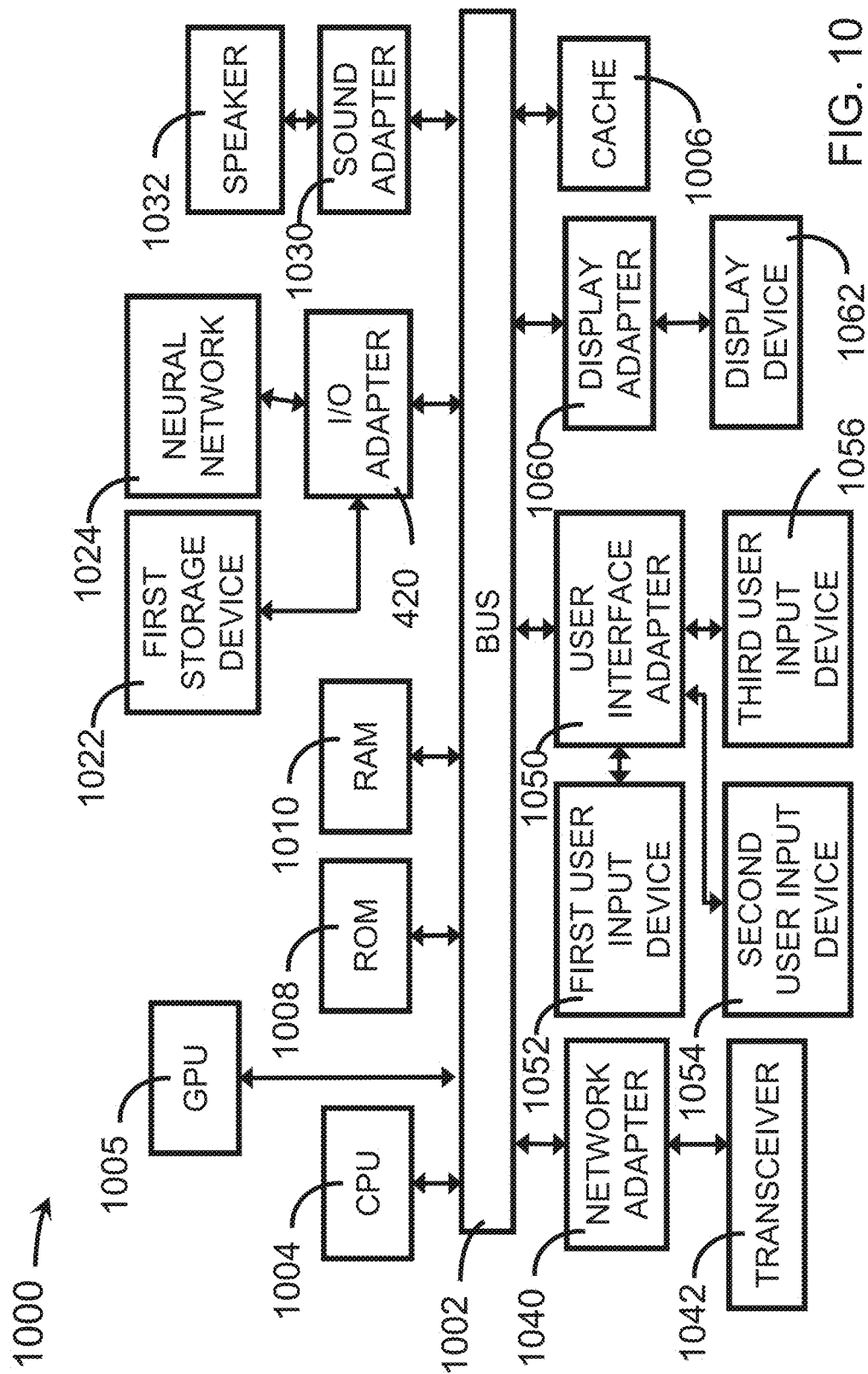
FIG. 10 is an exemplary processing system 1000 to which the present methods and systems may be applied, in accordance with an embodiment of the present invention.

FIG. 10 is an exemplary processing system 1000 to which the present methods and systems may be applied, in accordance with an embodiment of the present invention.

The processing system 1000 can include at least one processor (CPU) 1004 and may have a graphics processing (GPU) 1005 that can perform vector calculations/manipulations operatively coupled to other components via a system bus 402. A cache 1006, a Read Only Memory (ROM) 1008, a Random Access Memory (RAM) 1010, an input/output (I/O) adapter 4420420, a sound adapter 1030, a network adapter 1040, a user interface adapter 1050, and/or a display adapter 1060, can also be operatively coupled to the system bus 1002.

A first storage device 1022 and a second storage device 1024 are operatively coupled to system bus 1002 by the I/O adapter 420, where a neural network can be stored for implementing the features described herein. The storage devices 1022 and 1024 can be any of a disk storage device (e.g., a magnetic or optical disk storage device), a solid state storage device, a magnetic storage device, and so forth. The storage devices 1022 and 1024 can be the same type of storage device or different types of storage devices.

A speaker 1032 can be operatively coupled to the system bus 1002 by the sound adapter 1030. A transceiver 1042 can be operatively coupled to the system bus 1002 by the network adapter 1040. A display device 1062 can be operatively coupled to the system bus 1002 by display adapter 1060.

A first user input device 1052, a second user input device 1054, and a third user input device 1056 can be operatively coupled to the system bus 1002 by the user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 can be used to input and output information to and from the processing system 1000.

In various embodiments, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Moreover, it is to be appreciated that system 1000 is a system for implementing respective embodiments of the present methods/systems. Part or all of processing system 1000 may be implemented in one or more of the elements of FIGS. 1-9. Further, it is to be appreciated that processing system 1000 may perform at least part of the methods described herein including, for example, at least part of the method of FIGS. 1-9.

Figure 11:
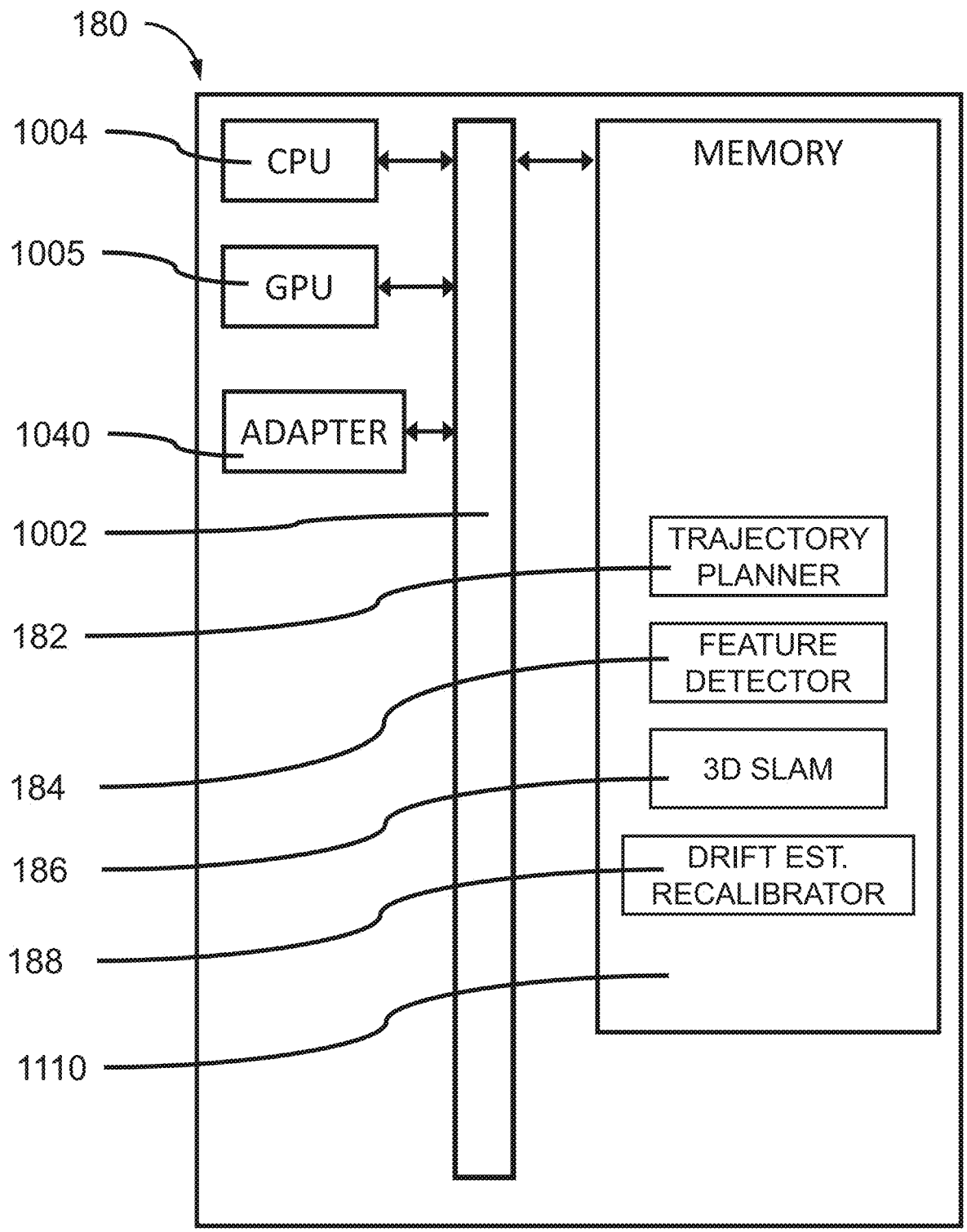
FIG. 11 is an exemplary computing system 180 configured to implement trajectory planning, feature detection, 3D SLAM, and drift estimation and recalibration, in accordance with an embodiment of the present invention.

FIG. 11 is an exemplary computing system configured to implement trajectory planning, feature detection, 3D SLAM, and drift estimation and recalibration, in accordance with an embodiment of the present invention.

In one or more embodiments, the computer system 180 can be a processing system 1000 configured to perform a computer implemented method of trajectory planning, feature detection, 3D SLAM, and drift estimation and recalibration, where the system can perform an accurate 3D model reconstruction of a visual feature using point cloud data.

In one or more embodiments, the computer system 180 can be a processing system 1000 having memory components 1110, including, but not limited to, the computer system's random access memory (RAM) 1010, hard drives 1022, and/or cloud storage to store and implement a computer implemented method of analyzing and classifying images. The memory components 1110 can also utilize a database for organizing the memory storage.

In various embodiments, the memory components 1110 can include a trajectory planner 182 that can be configured to identify a suitable flight path for quickly scanning an area of interest. The trajectory planner 182 can be configured to receive as input a GPS coordinate dataset and plot a flight path for a drone 110 that can minimize battery usage.

In various embodiments, the memory components 1110 can include a feature detector 184 that can perform feature detection and identification using cloud point data collected using a laser sensor (i.e., LIDAR). The feature detector 184 can be configured to identify one or more features of interest based on an objective function and user set parameters.

In various embodiments, the memory components 1110 can include 3D SLAM for 3D model construction from cloud point data communicated from a drone.

In various embodiments, the memory components 1110 can include a Drift Estimator and Recalibrator 188 configured to detect drifting of the drone from an expected location at some time during a flight, and calculate a correction to reposition the drone. The drift correction can be provided to the 3D SLAM to correct for matching of cloud point data from different scan frames.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for automatically constructing a 3-dimensional 3D) model of a feature using a drone, comprising:
generating a reconnaissance flight path that minimizes battery usage by the drone that includes estimating drift of the drone for the reconnaissance flight path and calculating a correction to recalibrate the reconnaissance flight path of the drone, while scanning a target feature by:
estimating a pose of the drone in each frame from compressed light detection and ranging (LIDAR) frames obtained from the drone by continuously executing 3D simultaneous localization and mapping (SLAM) to obtain a SLAM trajectory;
aligning the SLAM trajectory with a global positioning system (GPS) trajectory by determining rigid transformation matrices of the SLAM trajectory and the GPS trajectory having synchronized timestamps;
minimizing drift of the drone by resetting the reconnaissance flight path of the drone to return to its starting position when a computed root mean square error RMSE of the SLAM trajectory and the GPS trajectory is greater than a drift threshold;
conducting a discovery flight that uses the reconnaissance flight path;
transmitting reconnaissance laser sensor data from the drone to a processing system for target identification;
selecting a target feature for 3D model construction based on the reconnaissance laser sensor data;
scanning the target feature using a laser sensor;
transmitting laser sensor data for the target feature having a minimum point density from the drone to the processing system for 3D model construction; and
constructing the 3D model from the minimum point density laser sensor data.

2. The method as recited in claim 1, wherein the target feature is selected based on minimizing an objective function.

3. The method as recited in claim 1, wherein the laser sensor is LIDAR.

4. The method as recited in claim 3, further comprising compressing point cloud data collected by the LIDAR before transmitting the compressed point cloud data to the processing system.

5. The method as recited in claim 1, wherein scanning the target feature is conducted with the LIDAR aligned parallel with a direction of travel for a longitudinal flight path of the drone.

6. The method as recited in claim 1, wherein scanning the target feature starts from an origin and returns to the origin at an end of the reconnaissance flight path.

7. A system for automatically constructing a 3-dimensional (3D) model of a feature using a drone, comprising:
the drone, including onboard electronics and light detection and ranging (LIDAR); and
a computing system including:
a trajectory planner configured to generate a flight trajectory for the drone that scans an entire area of interest and minimizes flight duration;
a feature detector configured to identify individual visual features within a predefined area of interest;
a 3D Simultaneous Localization And Mapping (SLAM) configured to generate a 3D model of one or more identified visual features from received point cloud data, and
a drift estimator and recalibrator configured to estimate drift of the drone for a reconnaissance flight path and calculate corrections to recalibrate the reconnaissance flight path of the drone by:
estimating a pose of the drone in each frame from compressed LIDAR frames obtained from the drone by continuously executing 3D SLAM to obtain a SLAM trajectory;
aligning the SLAM trajectory with a global positioning system (GPS) trajectory by determining rigid transformation matrices of the SLAM trajectory and the GPS trajectory having synchronized timestamps;
minimizing drift of the drone by resetting the reconnaissance flight path of the drone to return to its starting position when a computed root mean square error (RMSE) of the SLAM trajectory and the GPS trajectory is greater than a drift threshold.

8. The system of claim 7, wherein the trajectory planner is further configured to generate the reconnaissance flight path that minimizes battery usage by the drone.

9. The system of claim 7, wherein the drift estimator and recalibrator is further configured to detect accumulated drift in position by the drone over the reconnaissance flight path, and correct for the accumulated drift in real-time.

10. The system of claim 7, wherein the feature detector is configured to identify individual visual features by detecting planar surfaces and estimating building height and boundaries from a plane surface forming a rooftop.

11. The system of claim 7, wherein the computing system receives compressed point clouds over a long-term evolution (LTE) network.

12. The system of claim 11, wherein the compressed point clouds utilize a communication bandwidth less than a bandwidth of the LTE network.

13. A non-transitory computer readable storage medium comprising a computer readable program automatically constructing a 3-dimensional (3D) model of a feature using a drone, wherein the computer readable program when executed on a computer causes the computer to:
generate a reconnaissance flight path that minimizes battery usage by a drone that includes estimating drift of the drone for the reconnaissance flight path, and calculating a correction to recalibrate the reconnaissance flight path of the drone, while scanning a target feature by:
estimating a pose of the drone in each frame from compressed light detection and ranging (LIDAR) frames obtained from the drone by continuously executing 3D simultaneous localization and mapping SLAM) to obtain a SLAM trajectory;
aligning the SLAM trajectory with a global positioning system (GPS) trajectory by determining rigid transformation matrices of the SLAM trajectory and the GPS trajectory having synchronized timestamps;
minimizing drift of the drone by resetting the reconnaissance flight path of the drone to return to its starting position when a computed root mean square error RMSE of the SLAM trajectory and the GPS trajectory is greater than a drift threshold;
communicate a reconnaissance flight path for a discovery flight to the drone;
receive reconnaissance laser sensor data from the drone for target identification;
select a target feature for 3D model construction based on the reconnaissance laser sensor data;
transmit coordinates for a scanning flight path for the target feature to the drone;
receive laser sensor data for the target feature having a minimum point density from the drone for 3D model construction; and
construct the 3D model from the minimum point density laser sensor data.

14. The non-transitory computer readable storage medium comprising a computer readable program, as recited in claim 13, wherein the target feature is selected based on minimizing an objective function.

15. The non-transitory computer readable storage medium comprising a computer readable program, as recited in claim 13, wherein the reconnaissance laser sensor data include compressed point clouds received over a long-term evolution (LTE) network.

16. The non-transitory computer readable storage medium comprising a computer readable program, as recited in claim 15, wherein the compressed point clouds utilize a communication bandwidth less than a bandwidth of the LTE network.

17. The non-transitory computer readable storage medium comprising a computer readable program, as recited in claim 16, wherein the scanning flight path is a longitudinal flight path that starts from an origin and returns to the origin at an end of the reconnaissance flight path.

18. The method of claim 1, wherein selecting the target feature further comprises removing outlying points that are further away from neighboring points obtained from points clustered based on spatial relationships determined using a GPS location of the drone.

19. The method of claim 1, wherein estimating the pose of the drone further comprises compressing the LIDAR frames with octree compression after removing irrelevant portions from the LIDAR frames by viewpoint filtering.

20. The method of claim 1, wherein generating the reconnaissance flight path further comprises balancing reconstruction accuracy, reconstruction completeness, and flight duration of the drone by performing simulations to minimize battery consumption for the drone.

* * * * *